United States Patent [19]
Morimoto et al.

[11] Patent Number: 5,479,888
[45] Date of Patent: Jan. 2, 1996

[54] DIVIDED CHAMBER TYPE DIESEL ENGINE

[75] Inventors: Yousuke Morimoto; Kiyoshi Hataura; Yasukazu Kamata, all of Sakai, Japan

[73] Assignee: Kubota Corporation, Osaka, Japan

[21] Appl. No.: 90,954

[22] Filed: Jul. 13, 1993

[51] Int. Cl.⁶ .................................................. F02B 19/12
[52] U.S. Cl. ...................... 123/262; 123/279; 123/193.4
[58] Field of Search ................... 123/193.4, 193.5, 123/193.6, 193.3, 262, 269, 263, 279, 307, 657, 661, 671

[56] References Cited

U.S. PATENT DOCUMENTS

| | | |
|---|---|---|
| 2,113,711 | 4/1938 | Ricardo . |
| 3,196,857 | 7/1965 | Zimmermann ............................ 123/269 |
| 3,965,872 | 6/1976 | Taira et al. ............................... 123/269 |
| 4,005,684 | 2/1977 | Habu ....................................... 123/193.6 |
| 4,058,090 | 11/1977 | Suzuki et al. .......................... 123/193.4 |
| 4,063,537 | 12/1977 | Lampredi ................................. 123/262 |
| 4,195,597 | 4/1980 | Hofbauer et al. ..................... 123/193.6 |
| 4,270,499 | 6/1981 | Frelund .................................... 123/263 |
| 4,742,804 | 5/1988 | Suzuki et al. ............................ 123/279 |
| 4,785,776 | 11/1988 | Tokura et al. .......................... 123/269 |
| 4,798,183 | 1/1989 | Hataura et al. ....................... 123/193.6 |
| 5,024,194 | 6/1991 | Shinzawa et al. ...................... 123/269 |

FOREIGN PATENT DOCUMENTS

| | | |
|---|---|---|
| 3314662 | 10/1984 | Germany . |
| 58-138217 | 11/1983 | Japan . |
| 1012023 | 1/1988 | Japan . |
| 2160262 | 12/1985 | United Kingdom . |

Primary Examiner—Marguerite Macy
Attorney, Agent, or Firm—Bacon & Thomas

[57] ABSTRACT

When viewing in parallel to a cylinder center axis (3), a combustion expanding gas injected from an injection hole (4) is adapted to form a pair of valve recesses (10), (11) located on the opposite sides of an injection axis (12) of the injection hole (4). A pair of valve recesses (10), (11) are formed concavely in a piston top surface (8) so as to be separately disposed on the opposite sides of the injection axis (12) of the injection hole (4). Respective swirl centers (14), (15) of a pair of swirling gas flows (6), (7) are located within the pair of valve recesses (10), (11).

8 Claims, 9 Drawing Sheets

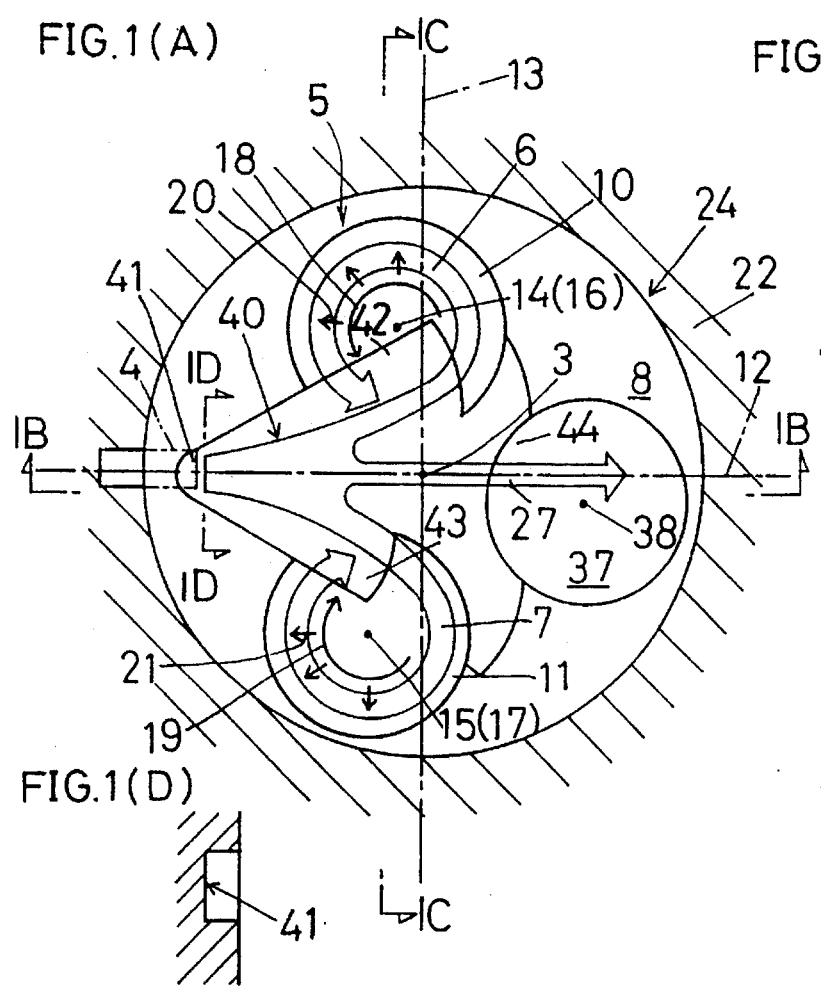
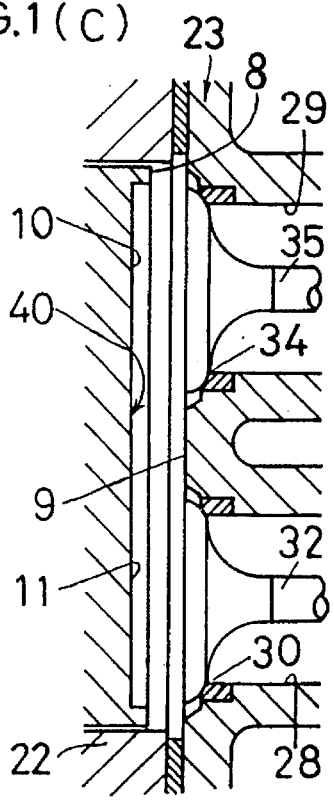
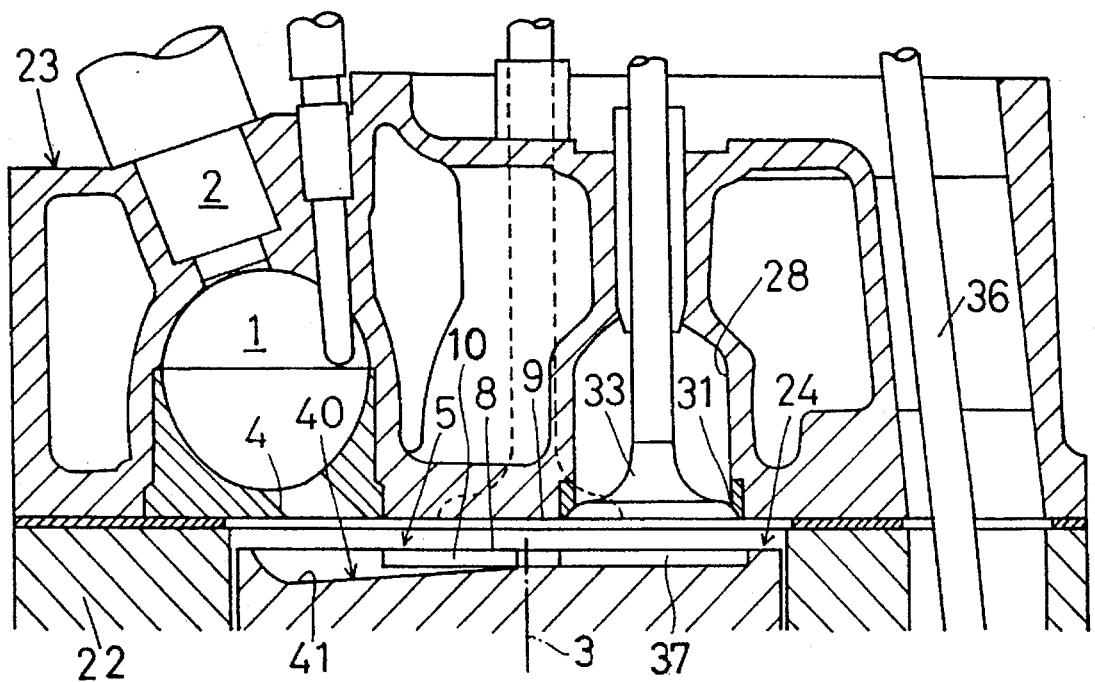
FIG.1(A)
FIG.1(B)
FIG.1(C)
FIG.1(D)

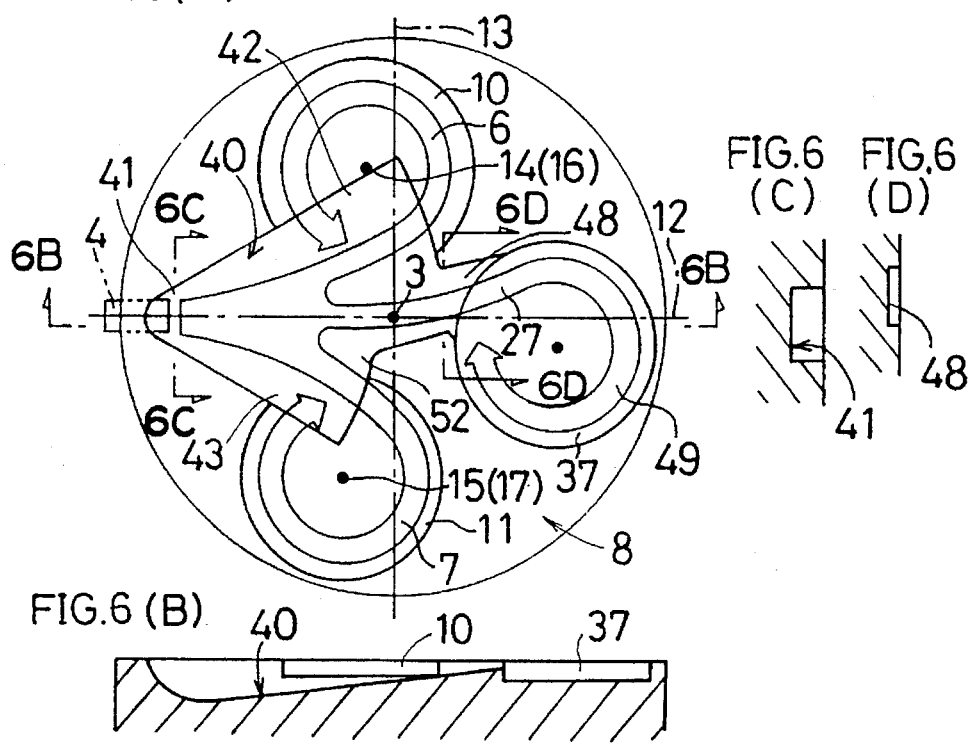
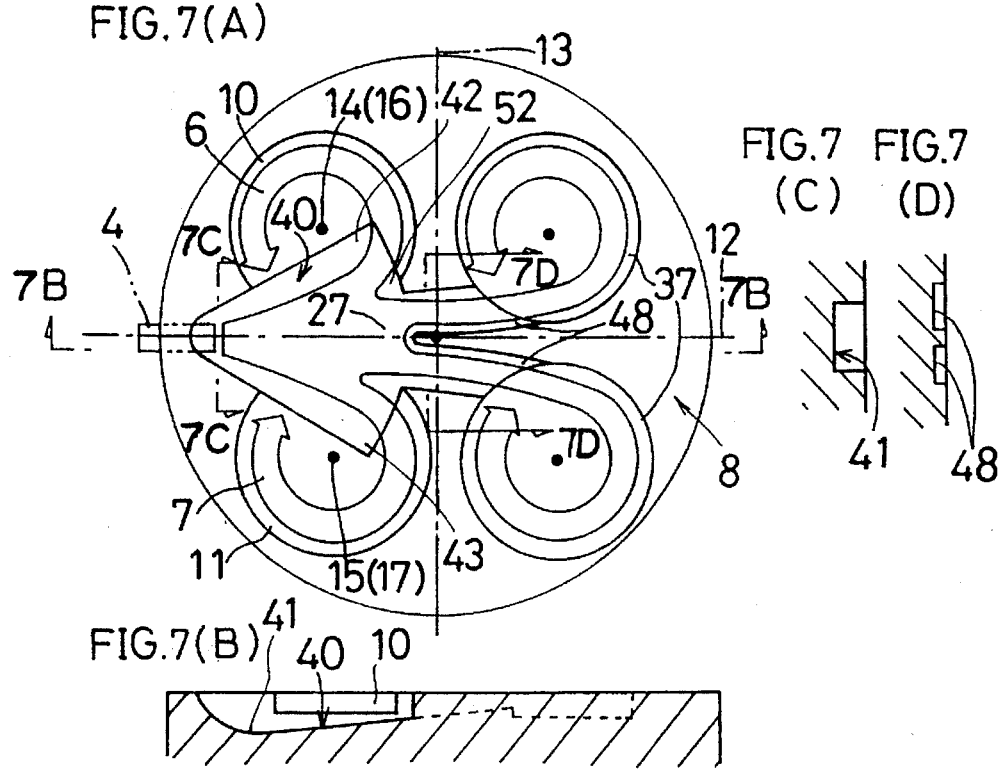

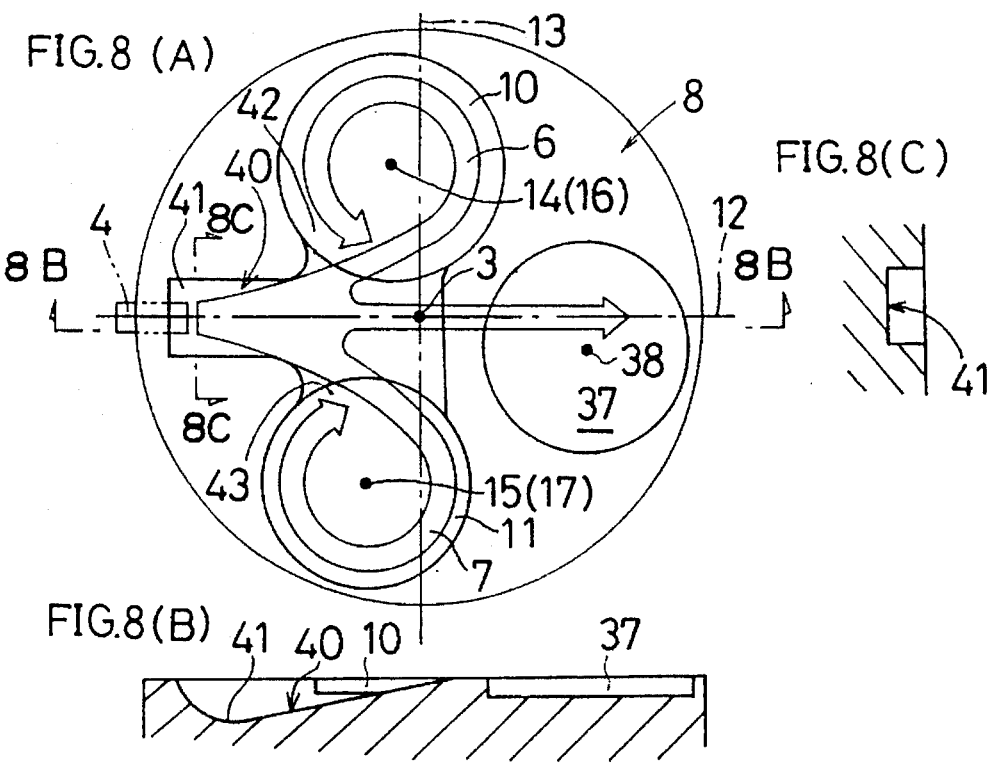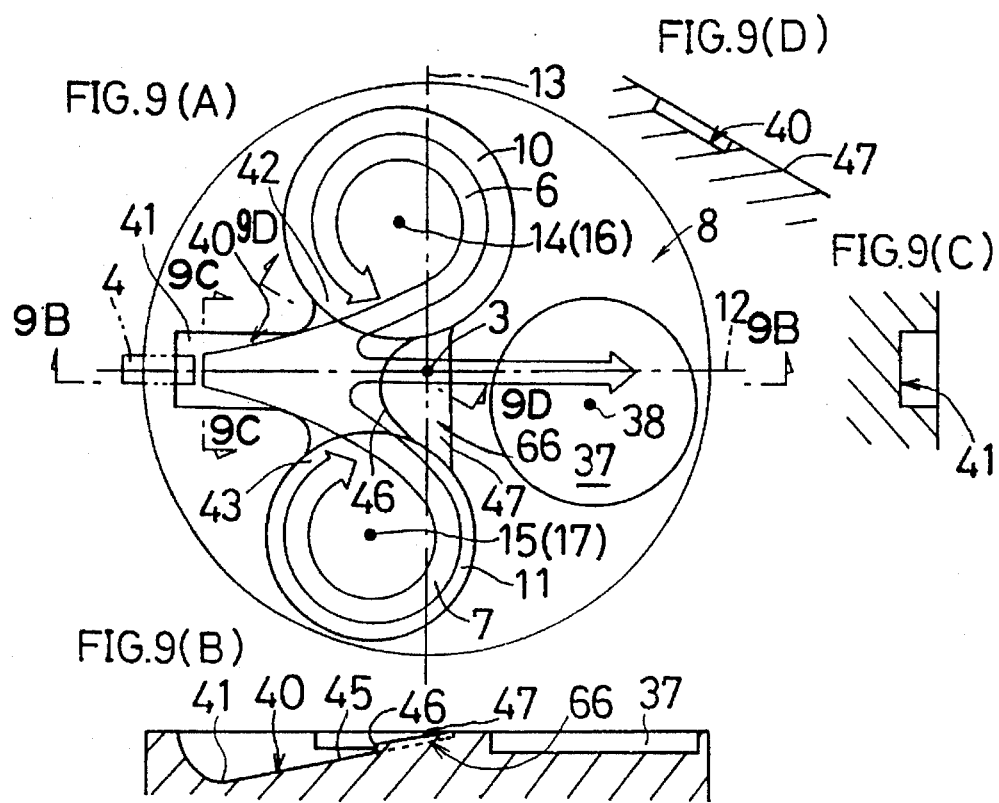

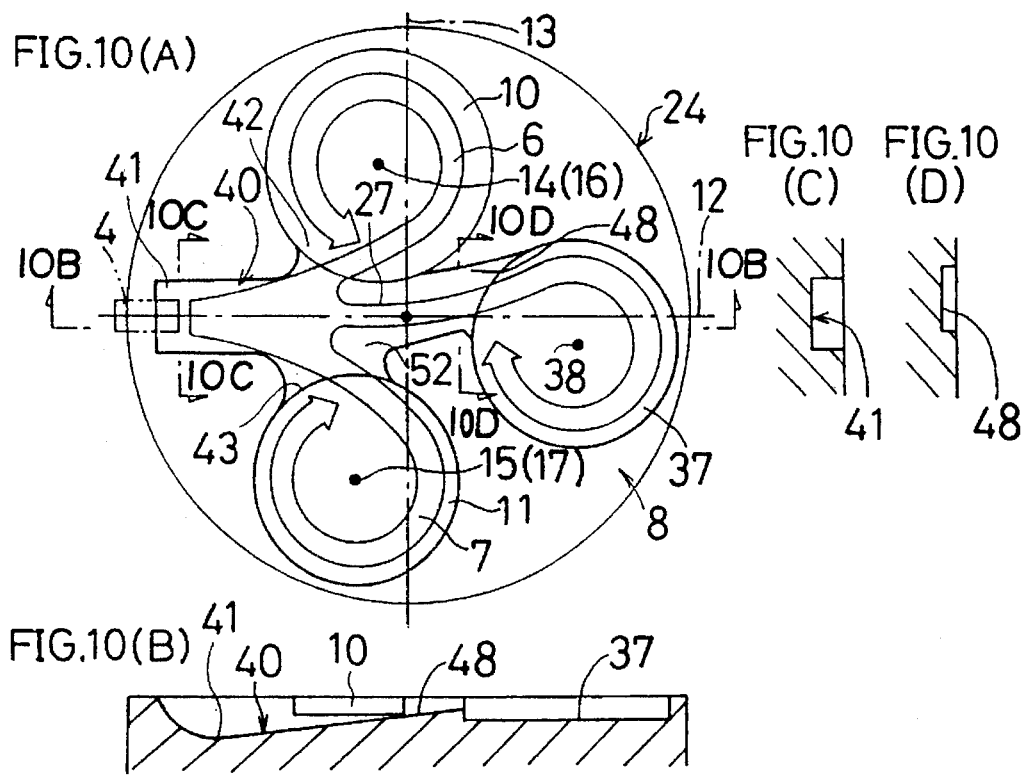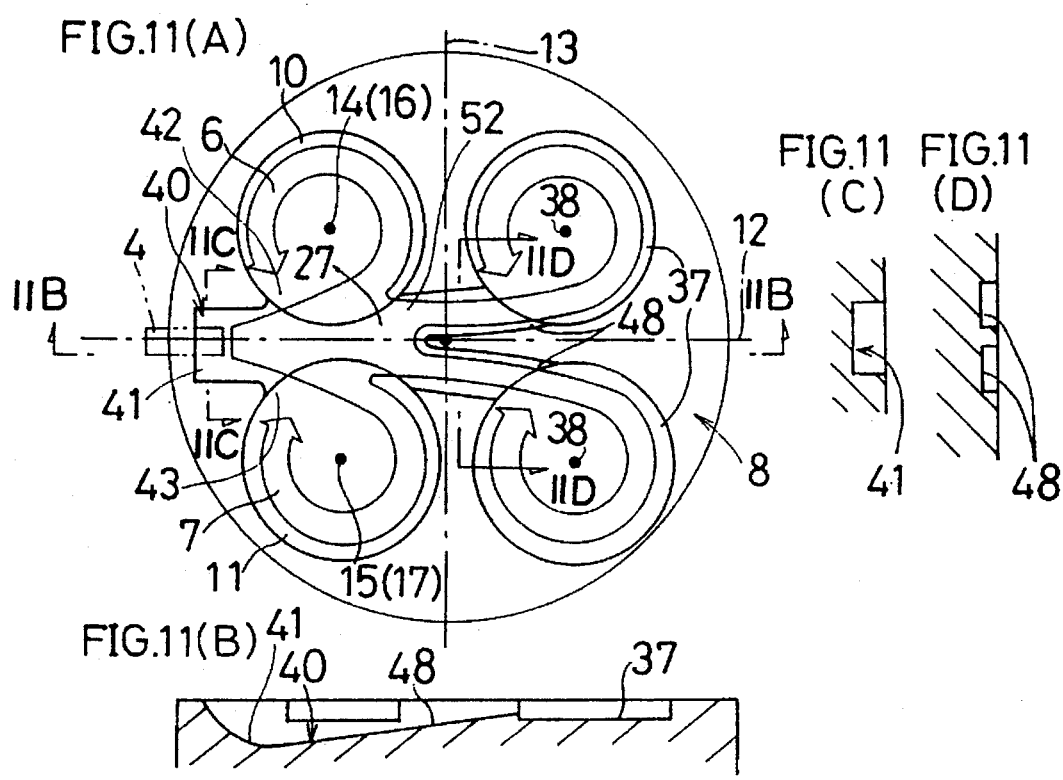

DIVIDED CHAMBER TYPE DIESEL ENGINE

BACKGROUND OF THE INVENTION

1. Field of the Invention

The present invention relates to a divided chamber type diesel engine.

2. Description of the Prior Art

Generally a divided chamber type diesel engine includes a cylinder head provided with a divided chamber while a main combustion chamber is formed within a cylinder. An injection hole is formed in the cylinder head eccentrically to a center axis of the cylinder so as to descend at an angle toward the center axis of the cylinder.

In one of such engines, a pair of valve recesses are formed concavely in a top surface of a piston. In this engine, since a volumetric ratio of the valve recesses relative to an entire volume of the main combustion chamber becomes comparatively large when its piston is near to a top dead center position, a lot of air accumulates locally within the valve recesses and a combustion expanding gas injected from the injection hole can be mixed effectively so as to improve combustion performance. Actually, however, the combustion performance is not so much improved in comparison with an engine having no valve recesses. It is supposed that the reason is that the mixing between the air within the valve recesses and the combustion expanding gas is not carried out effectively.

SUMMARY OF THE INVENTION

It is an object of the present invention to mix air within a valve recess and a combustion expanding gas effectively in a divided chamber type diesel engine.

For accomplishing the above-mentioned object, the present invention is constructed as follows:

For example, as shown in FIG. 1 which corresponds to a first embodiment of the present invention, a cylinder head is provided with a divided chamber while a main combustion chamber is formed within a cylinder. An injection hole is formed in the cylinder head eccentrically to a center axis of the cylinder so as to descend at an angle toward a center portion of the cylinder.

According to that construction, a combustion expanding gas injected from the injection hole provides a straight advancing gas flow along an injection axis of the injection hole and a pair of swirling gas flows located on the opposite sides of the injection axis when viewed in parallel to the center axis of the cylinder.

Therefore, at least a pair of valve recesses are formed concavely in at least one of a cylinder head surface facing the main combustion chamber and a piston top surface so as to be disposed on the opposite sides of the injection axis of the injection hole when viewed in parallel to the center axis of the cylinder. Then, each swirl center of the pair of swirling gas flows is located within the pair of valve recesses when viewed in parallel to the center axis of the cylinder.

The following advantages can be obtained by the above-mentioned construction of the present invention:

That is, as exemplarily shown in FIG. 1(A), the air within the pair of the valve recesses is externally surrounded by the swirling gas flows and drawn into these swirling flows so as to swirl in the same directions as the swirling gas flows. In this case, since a specific weight of the air is larger than those of the swirling gas flows, the air diffuses into the swirling gas flows due to a difference between centrifugal forces thereof so that they can mix effectively to enhance the combustion efficiency within the main combustion chamber. Accordingly, the combustion performance is improved, so that an output performance can be improved and a discharged amount of an unburned harmful ingredient in an exhaust gas can be decreased.

The flowing state of the combustion expanding gas within the main combustion chamber has been confirmed by the inventors in accordance with the present invention as follows. The top surface of the piston was coated thinly with a vaseline mixed with a powder of molybdenum disulfide and then the engine was operated in a motoring mode. Thereupon, the vaseline was melted due to a compression heat generated within the main combustion chamber during ascent of the piston. Then, when the piston started to descend from top dead center, air was injected into the main combustion chamber through the injection hole due to a pressure difference produced between the divided chamber and the main combustion chamber and the air travelled along the top surface of the piston. The vaseline was drawn into the flow of air so that the powders of molybdenum disulfide were traced along the flowing path.

Accordingly, it became possible to confirm the flowing state of the air within the main combustion chamber by dismounting the piston after the motoring operation proceeded for a predetermined time and observing the orientation of the powders of molybdenum disulfide traced on the top surface of the piston. As a result, the inventors confirmed that the air formed a straight advancing flow along the injection axis of the injection hole and a pair of swirling flows located on the opposite sides of the injection axis, when viewed in parallel to the cylinder center axis. Based on this knowledge, the inventors concluded that the combustion expanding gas injected from the injection hole showed the same flowing state as that of the above-mentioned air within the main combustion chamber when the engine was operated.

Then, based on this determination, the inventors observed in detail carbon attached to the top surface of the piston dismounted after the engine was operated for the predetermined time and confirmed that the carbon was attached thereto in substantially the same orientation as that of the above-mentioned molybdenum disulfide to prove this conclusion. Further, it was also confirmed that the positions of the swirl centers of the pair of swirling gas flows were substantially constant in the engine even when the engine revolution speed was varied or an amount of fuel injected into the divided chamber was changed.

Further, by the above-mentioned similar confirmation way, the inventors investigated positional relations between the valve recesses and the swirling gas flows in a conventional engine with the valve recesses and also confirmed that the swirl centers of the swirling gas flows were offset from the valve recesses when viewed in parallel to the cylinder center axis.

Resultantly, the inventors supposed that the air within the valve recesses and the swirling gas flows were mixed effectively and the combustion performance was improved greatly when the centers of the swirling gas flows were located within the valve recesses when viewed in parallel to the cylinder center axis, so the present invention was proposed by the inventors.

BRIEF DESCRIPTION OF THE DRAWINGS

FIG. 1 is a view of a first embodiment of the present invention; FIG. 1(A) is a plan view of a piston internally mounted into a cylinder; FIG. 1(B) is a sectional view taken along the 1B—1B line in FIG. 1(A); FIG. 1(C) is a sectional view taken along the 1C—1C line in FIG. 1(A); and FIG. 1(D) is a sectional view taken along the 1D—1D line in FIG. 1(A).

FIG. 2 is a schematic view of an injection hole employed in the first embodiment of the present invention.

FIG. 3 is an explanatory view of a cylinder head used in the first embodiment of the present invention.

FIG. 5 is an explanatory view of a piston employed in a third embodiment of the present invention.

FIG. 6 is an explanatory view of a piston employed in a fourth embodiment of the present invention; FIG. 6(A) is a plan view of the piston; FIG. 6(B) is a sectional view taken along the 6B—6B line in FIG. 6(A); FIG. 6(C) is a sectional view taken along the 6C—6C line in FIG. 6(A); and FIG. 6(D) is a sectional view taken along the 6D—6D line in FIG. 6(A).

FIG. 7 is an explanatory view of a piston employed in a fifth embodiment of the present invention; FIG. 7(A) is a plan view of the piston; FIG. 7(B) is a sectional view taken along the 7B—7B line in FIG. 7(A); FIG. 7(C) is a sectional view taken along the 7C—7C line in FIG. 7(A); and FIG. 7(D) is a sectional view taken along the 7D—7D line in FIG. 7(A).

FIG. 8 is an explanatory view of a piston employed in a sixth embodiment of the present invention; FIG. 8(A) is a plan view of the piston; FIG. 8(B) is a sectional view taken along the 8B—8B line in FIG. 8(A); and FIG. 8(C) is a sectional view taken along the 8C—8C line in FIG. 8(A).

FIG. 9 is an explanatory view of a piston employed in a seventh embodiment of the present invention; FIG. 9(A) is a plan view of the piston; FIG. 9(B) is a sectional view taken along the 9B—9B line in FIG. 9(A); FIG. 9(C) is a sectional view taken along the 9C—9C line in FIG. 9(A); and FIG. 9(D) is a sectional view taken along the 9D—9D line in FIG. 9(A).

FIG. 10 is an explanatory view of a piston employed in an eighth embodiment of the present invention; FIG. 10(A) is a plan view of the piston; FIG. 10(B) is a sectional view taken along the 10B—10B line in FIG. 10(A); FIG. 10(C) is a sectional view taken along the 10C—10C line in FIG. 10(A); and FIG. 10(D) is a sectional view taken along the 10D—10D line in FIG. 10(A).

FIG. 11 is an explanatory view of a piston employed in a ninth embodiment of the present invention; FIG. 11(A) is a plan view of the piston; FIG. 11(B) is a sectional view taken along the 11B—11B line in FIG. 11(A); FIG. 11(C) is a sectional view taken along the 11C—11C line in FIG. 11(A); and FIG. 11(D) is a sectional view taken along the 11D—11D line in FIG. 11(A).

DESCRIPTION OF THE PREFERRED EMBODIMENTS

Figure 2A:
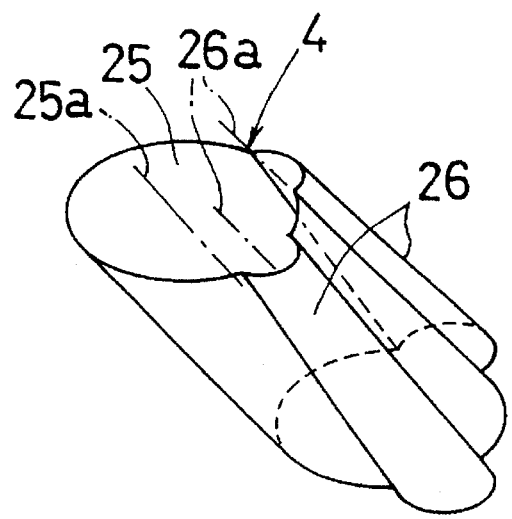
FIG. 2(A) is a perspective view of the injection hole viewed from the lateral side.

A first embodiment of the present invention will be explained with reference to FIGS. 1 through 3. In this first embodiment, a vertical multi-cylinder diesel engine provided with a divided chamber type combustion chamber has the following construction. That is, as shown in FIG. 1(B), a cylinder head 23 is mounted to an upper side of a cylinder 22 while a piston 24 is internally mounted into the cylinder 22 so as to form a main combustion chamber 5 within the cylinder 22. The cylinder head 23 has a substantially spherical divided chamber 1 of the swirl chamber type formed therein to which a fuel injection nozzle 2 faces. The divided chamber 1 is connected in communication to the main combustion chamber 5 through the injection hole 4. As shown in FIG. 1(A), the injection hole 4 is disposed near to the inner peripheral surface of the cylinder 22, namely eccentrically to a cylinder center 3. As shown in FIG. 2, this injection hole 4 comprises a main injection hole 25 and a pair of left and right injection holes 26, 26, disposed on the opposite left and right sides thereof.

The main injection hole 25 is formed in such an inclined cylindrical orientation that its axis 25a is inclined at an elevation angle of about 45 degrees relative to a reference plane defined by a cylinder head surface 9, facing the main combustion chamber 5 and oriented to the cylinder center axis 3. It is enough to direct this axis 25a toward a center portion of the cylinder 22 and it may be shifted from the cylinder center axis 3 in some degree.

Figure 2B:
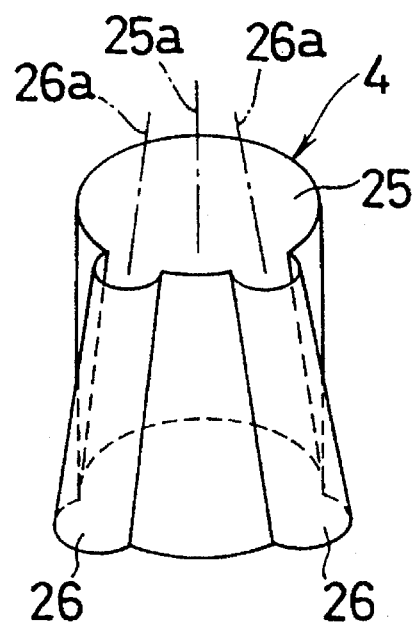
FIG. 2(B) is a perspective view of the injection hole viewed from the front side.

Side injection holes 26, 26 are formed in a truncated cone configuration enlarging downwards with their axes 26a, 26a being inclined, as shown in FIG. 2(A), at an elevation angle of about 45 degree similar to that of the axis 25a of the main injection hole 25 when viewed laterally and so inclined such that their lower portions spread outwardly as shown in FIG. 2(B) when viewed from the front. The elevation angle of the axis 25a of the main injection hole 25 and the elevation angle of the axis 26a of the side injection hole 26 are not limited especially, but preferably set to around 40 degree–50 degree.

In such a divided Type combustion chamber, the combustion expanding gas injected from the divided chamber 1 through the injection hole 4 flows as follows within the main combustion chamber 5. That is, as shown in FIG. 1(A), the combustion expanding gas injected from the injection hole 4 forms a straight advancing gas flow 27 along the injection axis 12 of the injection hole 4 and a pair of swirling gas flows 6, 7 located on the opposite sides of the injection axis 12 of the injection hole 4 when viewed in parallel to the cylinder center axis 3. The injection axis 12 of the injection hole 4 coincides with an extended line of the axis 25a of the min injection hole 25.

The generation positions of the respective swirl center 14, 15 of the pair of swirling gas flows 6, 7 are as follows. That is, when a phantom transverse line 13 perpendicular to the injection axis 12 of the injection hole 4 is defined imaginarily in the diametral direction of the cylinder 22, the respective swirl centers 14, 15 are generated in eccentric positions from this phantom transverse line 13 to the side of the injection hole 4. Incidentally, when the injection hole 4 comprises only the main injection hole 5, the swirl radii of the pair of swirling gas flows 6, 7 become smaller, but the respective swirl centers 14, 15 are generated at substantially the same positions as those of this embodiment.

As shown in FIGS. 1(B), (C), an intake passage 28 and an exhaust passage 29 are formed in the cylinder head 23 while intake valves 32, 33 are disposed in an intermediate intake valve opening 30 and an end intake valve opening 31 of the intake passage 28 so as to be opened and closed therein respectively and an exhaust valve 35 is disposed in an exhaust valve opening 34 of the exhaust passage 29, so that there is provided a so-called three-valve arrangement. These intake and exhaust valves 32, 33, 35 are adapted to be opened and closed in a predetermined timed manner by a valve actuation device comprising a push rod 36 and so on. As shown in FIG. 1(A), a pair of left and right recesses 10, 11 and a foreside valve recess 37 are concavely formed in a piston top surface 8 so as to be positioned opposite to the intake and exhaust valves 32, 33, 35 respectively. Respective recess center 16, 17 of the pair of valve recesses 10, 11 are set at substantially equal distances from the injection hole 4.

In order to carry out an effective mixing of air within the pair of valve recesses 10, 11 and the pair of swirling gas flows 6, 7 as shown in FIG. 1(A), the respective swirl centers 14, 15 of the pair of swirling gas flows 6, 7 are located in the respective recess centers 16, 17 of the pair of valve recesses 10, 11 when viewed in parallel to the cylinder center axis 3. It is enough for the respective recess center 16, 17 and the swirl centers 14, 15 to substantially coincide with each other.

According to the above-mentioned construction, the air within the pair of valve recesses 10, 11 is surrounded externally by the swirling gas flows 6, 7 respectively and are caused to swirl in the same directions as those of the swirling gas flows 6, 7 as indicated by the arrows 18, 19. In this case, since a specific weight of air is larger than that of the combustion expanding gas, the air diffuses into the swirling gas flows 6, 7 due to a centrifugal force difference as indicated by the arrows 20, 21 and the mixing thereof can be effectively carried out.

As shown in FIG. 1(A), the foreside valve recess 37 is disposed in the injection axis 12 of the injection hole 4 when viewed in parallel to the cylinder center axis 3. Therefore, also a mixing of air within the foreside valve recess 37 and the straight advancing gas flow 27 is carried out effectively. A recess center 38 of this valve recess 37 is situated near to the injection axis 12 of the injection hole 4. It is preferable to make the position of this recess center 38 substantially coincide with the injection axis 12.

Further, a fan-shaped gas passing groove 40 is formed concavely in the piston top surface 8. When viewed in parallel to the cylinder center axis 3, this gas passing groove 40 has its entrance portion 41 so formed so as to overlap the injection hole 4 and has its width gradually spreading wider as well as its depth gradually getting shallower the farther from the injection hole 4 along the injection axis 12 of the injection hole 4. The left and the right portions of the gas passing groove 40 overlap respective portions 42, 43 of the pair of left and right valve recesses 10, 11 as to be nearer to the injection hole 12 while the end central portion of the gas passing groove 40 overlaps such a portion 44 of the valve recess 37 as to be nearer to the phantom transverse line 13.

According to such a construction, since the combustion expanding gas injected from the injection hole 4 can pass through the gas passing groove 40 with less resistance, the flow speeds of the pair of left and right swirling gas flows 6, 7 and the straight gas flow 27 are increased, so that the mixing of the air within all the valve recesses 10, 11, 37 and the combustion expanding gas can be further promoted.

Figure 3A:
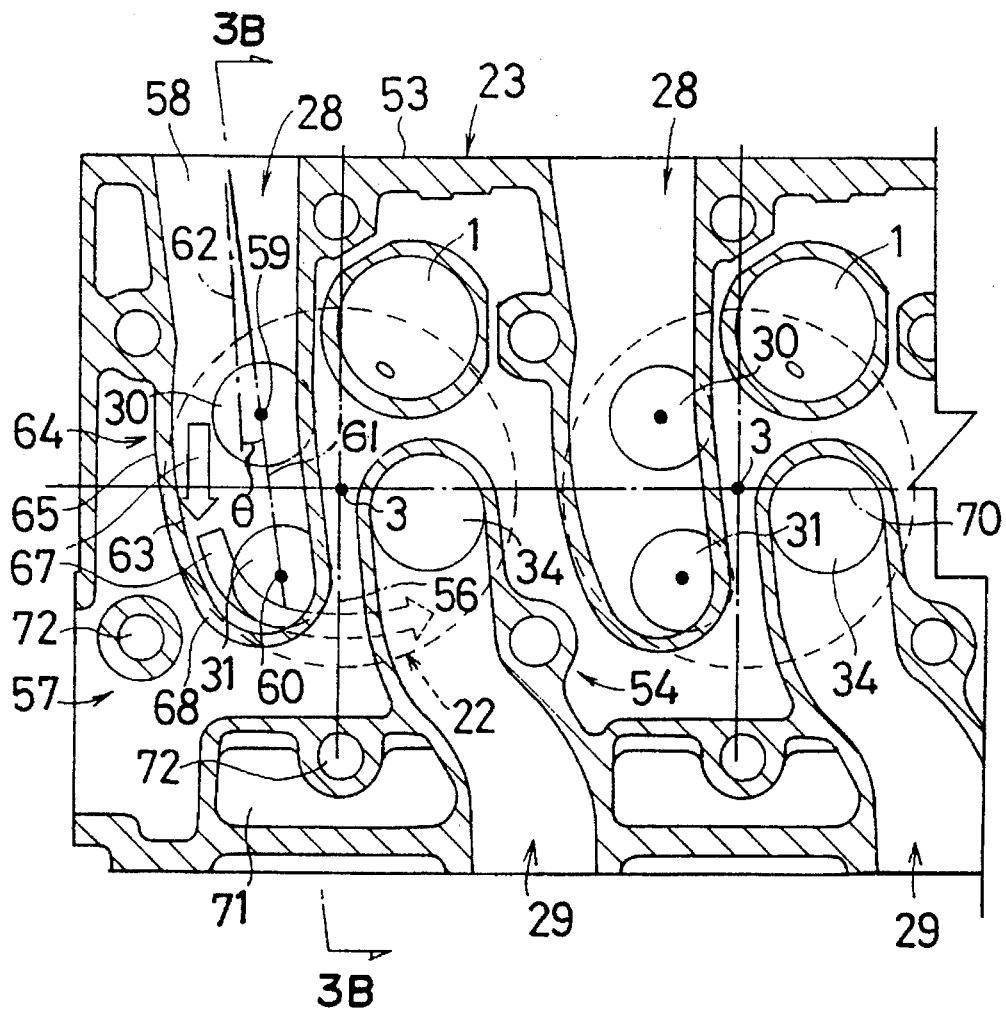
FIG. 3(A) is a horizontal sectional plan view.
Figure 3B:
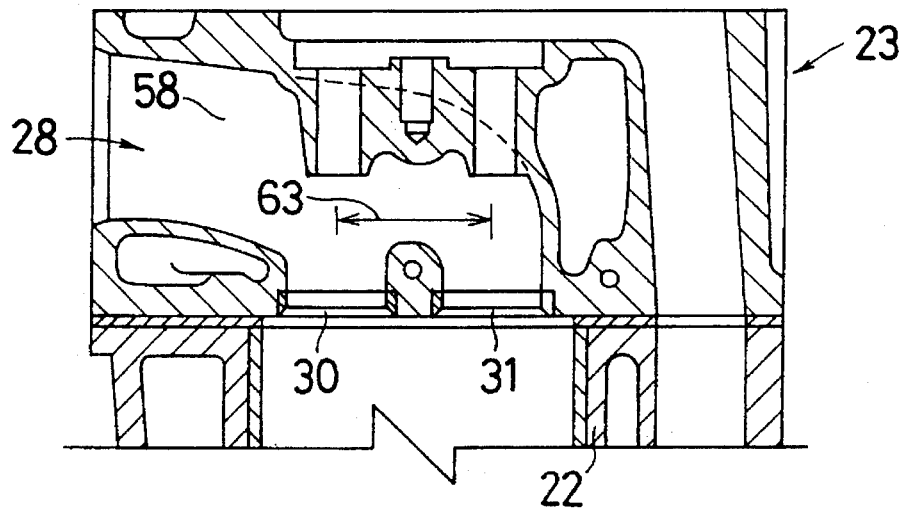
FIG. 3(B) is a sectional view taken along the 3B—3B line in FIG. 3(A).

Next a construction of the cylinder head according to the first embodiment will be explained in detail hereinafter. As shown in FIG. 3(A), when a second phantom transverse line 56 is imaginarily defined in the diametral direction of the cylinder 22 so as to intersect the cylinder center axis 3 and a crank axis 70, when viewed in parallel to the cylinder center axis 13, a foreside region 54 and a backside region 57 are separated by the second phantom transverse line 56 while the intake passage 28 is located in the backside region 57. This intake passage 28 is formed in a right wall 53 of the cylinder head 23 so as to extend leftwards therefrom. A suction air induction port portion 58 on an entrance side of the intake passage 28 is formed in parallel to the second phantom transverse line 56. It is enough that the suction air induction port portion 58 extends substantially in parallel to the second phantom transverse line 56. In an intermediate portion and an end portion of the intake passage 28, there is provided an intermediate intake valve opening 30 and an end intake valve opening 31 respectively, which are disposed separately on the left side and the right side of the crank axis 70.

Since a center 60 of the end intake valve opening 31 rather than a center 59 of the intermediate intake valve opening 30 is disposed nearer to the second phantom transverse line 56, a center passing line 61 passing through both the centers 59, 60 is inclined relative to an axis 62 of the suction air induction port portion 58. Since an inter-valve-opening port portion 63 located between both the centers 59, 60 is formed in parallel to the center passing line 61, an orientation of this inter-valve-opening port portion 63 is inclined relative to an orientation of the suction air induction port portion 58. It is enough that the inter-valve-opening port portion 63 extends substantially in parallel to the center passing line 61. Incidentally, the symbol 8 in the figures designates an inclination angle of the center passing line 61 relative to the axis 62 of the suction air induction port portion 58.

According to such a construction, a suction air 67 going to pass through the inter-valve-opening port 63 tends to advance straight due to its inertia while being directed by the suction air induction port portion 58. Since the orientation of the inter-valve-opening port portion 63 is inclined relative to that of the suction air induction port portion 58, this suction air 67 is guided by an external portion 65 of the surrounding wall 64 of the inter-valve-opening port portion 63 so as to reach the end port portion 68 and then runs around along its arcuate wall so as to be sucked from the end intake valve opening 31 into the cylinder 22. Thereby, since the suction air 67 to be sucked from the end intake valve opening 31 into the cylinder 22 is directed so as to run along the inner peripheral surface of the cylinder 22, a generation of turbulent flow as an intake resistance in the neighborhood of the end intake valve opening 31 is prevented so that a charging efficiency for the suction air can be maintained high.

When viewed in parallel to the cylinder center axis 3, the external portion 65, remote from the second phantom transverse line 56, of the surrounding wall 64 of inter-valve-opening port portion 63 is curved in an outwardly swelling configuration. Therefore, since the suction air 67 to be guided by this external portion 65 is guided smoothly by that curve, a guide resistance for the suction air 67 can be made small so that the charging efficiency for the suction air can be maintained higher in comparison with a case of a straight formation of the external portion 65.

Further, a diameter of the suction air induction port portion 58 is reduced in a region from its entrance portion to its end portion. Thereby, the flow speed of the suction air flowing from the suction air induction port portion 58 into the inter-valve-opening port portion 63 is increased, such that the flow speed of the air to be sucked into the cylinder 22 is increased, and a swirl speed within the cylinder 22 is increased.

Incidentally, an exhaust passage 29 is formed in the foreside region 54 relative to the second phantom transverse line 56 so as to extend leftwards from the crank axis 70. An exhaust valve opening 34 is disposed in an entrance portion of the exhaust passage 29. The divided combustion chamber 1 is disposed on the right side of the crank axis 70 and on the backside of the second phantom transverse line 56. A push rod chamber 71 is disposed on the left side of the crank axis 70 in the second phantom transverse line 56. The symbol 72 in the figures designates head bolt insertion holes. These are arranged in the total number of six at intervals of 60 degrees so as to surround the cylinder 22.

FIGS. 4 through 14 show a second through twelfth embodiments while the same component parts as those in the above-mentioned first embodiment will be referenced with the same symbols. It should be understood that the component parts not described and not shown in the figures particularly in the second embodiment through the twelfth embodiment have the same constructions as those in the first embodiment as far as they are not departing from the spirit of the present invention.

Figure 4:
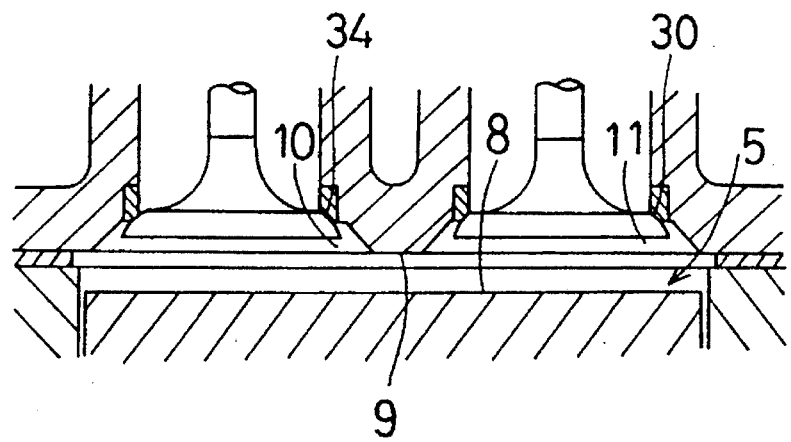
FIG. 4 is a vertical sectional view of a cylinder head employed in a second embodiment of the present invention.
Figure 5A:
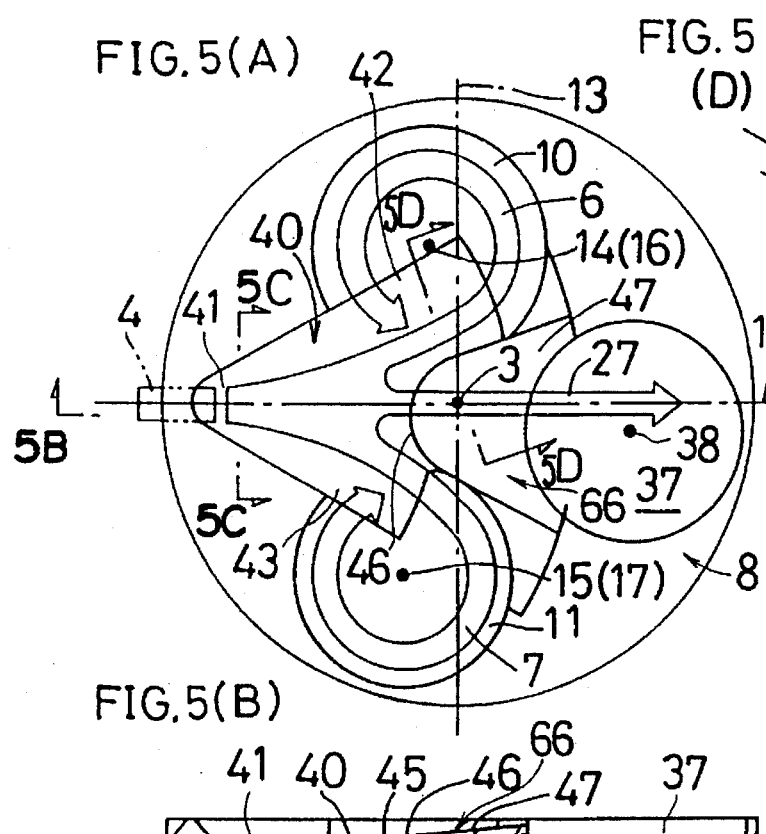
FIG. 5(A) is a plan view of the piston.
Figure 5D:
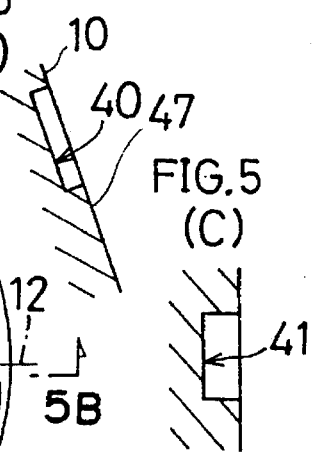
FIG. 5(D) is a sectional view taken along the line 5D—5D in FIG. 5(A).
Figure 5C:
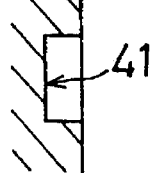
FIG. 5(C) is a sectional view taken along the 5C—5C line in FIG. 5(A)
Figure 5B:
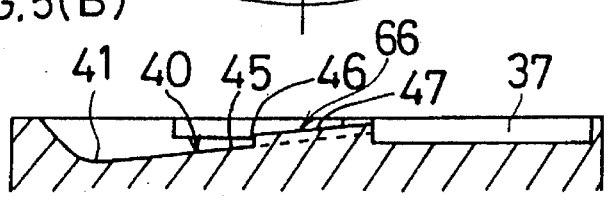
FIG. 5(B) is a sectional view taken along the 5B—5B line in FIG. 5(A)

The second embodiment shown in FIG. 4 is a modified example of the first embodiment shown in FIG. 1, wherein the pair of left and right valve recesses 10, 11 are formed in the cylinder head surface 9 facing the main combustion chamber 5. These valve recesses 10, 11 are formed concentrically with the exhaust valve opening 34 and the intermediate intake valve opening 30.

The third embodiment shown in FIG. 5 is a modified example of the first embodiment shown in FIG. 1, wherein an upheaved portion 66 is additionally formed in the piston top surface 8. When viewed in parallel to the cylinder center axis 3, this upheaved portion 66 is disposed between the pair of left and right valve recesses 10, 11 and on the injection axis 12 of the injection hole 4 and projects out from an inner bottom 45 of the gas passing groove 40. When viewed in parallel to the cylinder axis 3, an edge 46 of the upheaved portion 66 facing the injection hole 4 is formed arcuately and raised from the inner bottom 45 of the gas passing groove 40. The gas passing groove 40 is bifurcated by the raised edge 46. An upper surface 47 of the upheaved portion 66 is formed in an acclivous manner and like a step with respect to the inner bottom 45 of the gas passing groove 40.

According to such a construction, a portion of the straight advancing gas flow 27 is deflected leftwards and rightwards by a resistance of the edge 46 of the upheaved portion 66, so that the flow speeds of the swirling gas flows 6, 7 are increased so as to further promote the mixing of the air within the pair of left and right valve recesses 10, 11 and the swirling gas flows 6, 7.

The fourth embodiment shown in FIG. 6 is a modified example of the first embodiment shown in FIG. 1, wherein the gas passing groove 40 is short in length and a straight advancing gas flow deflection groove 48 is so formed as to extend from its end portion 52 and to be connected tangentially to the foreside valve recess 37. According to this construction, the straight advancing gas flow deflection groove 48 so as to be introduced into the foreside valve recess 37 tangentially, so that a new swirling gas flow 49 is generated herein to further promote the mixing of the air kept within the foreside valve recess 37 and the straight advancing gas flow 27.

The fifth embodiment shown in FIG. 7 is a modified example of the fourth embodiment shown in FIG. 6, which has been applied to a four-valve type engine. That is, the foreside valve recess 37 is paired in the piston top surface 8 and two straight advancing gas flow deflection grooves 48, 48 are extended from the end portion 52 of the gas guide groove 40 so as to be connected tangentially to these two foreside valve recesses 37, 37.

The sixth embodiment shown in FIG. 8 is a modified example of the first embodiment shown in FIG. 1, wherein the shape of the gas guide groove 40 is modified to a rectangular one. This gas passing groove 40 is so formed as to get shallower in depth gradually from its entrance portion 41 as it departs farther from the injection hole 4 along the injection axis 12 of the injection hole 4. The left and the right portions of the gas passing groove 40 are connected to the respective portions 42, 43, nearer to the injection axis 12, of the pair of left and right valve recesses 10, 11.

The seventh embodiment shown in FIG. 9 is a modified example of the sixth embodiment shown in FIG. 8 wherein an upheaved portion 66, similar to that of the third embodiment shown in FIG. 5 is additionally formed.

The eighth embodiment shown in FIG. 10 is a modified example of the sixth embodiment shown in FIG. 8, wherein the straight advancing gas flow deflection groove 48 is extended from the end portion 52 of the gas passing groove 40 so as to be connected tangentially to the foreside valve recess 37.

The ninth embodiment shown in FIG. 11 is a modified example of the eighth embodiment shown in FIG. 10, which has been applied to a four-valve type engine. That is, the foreside valve recess 37 is paired in the piston top surface 8 and two straight advancing gas flow deflection grooves 48, 48 extend from the end portion 52 of the gas guide groove 40 so as to be connected tangentially to the two foreside valve recesses 37, 37.

Figure 12:
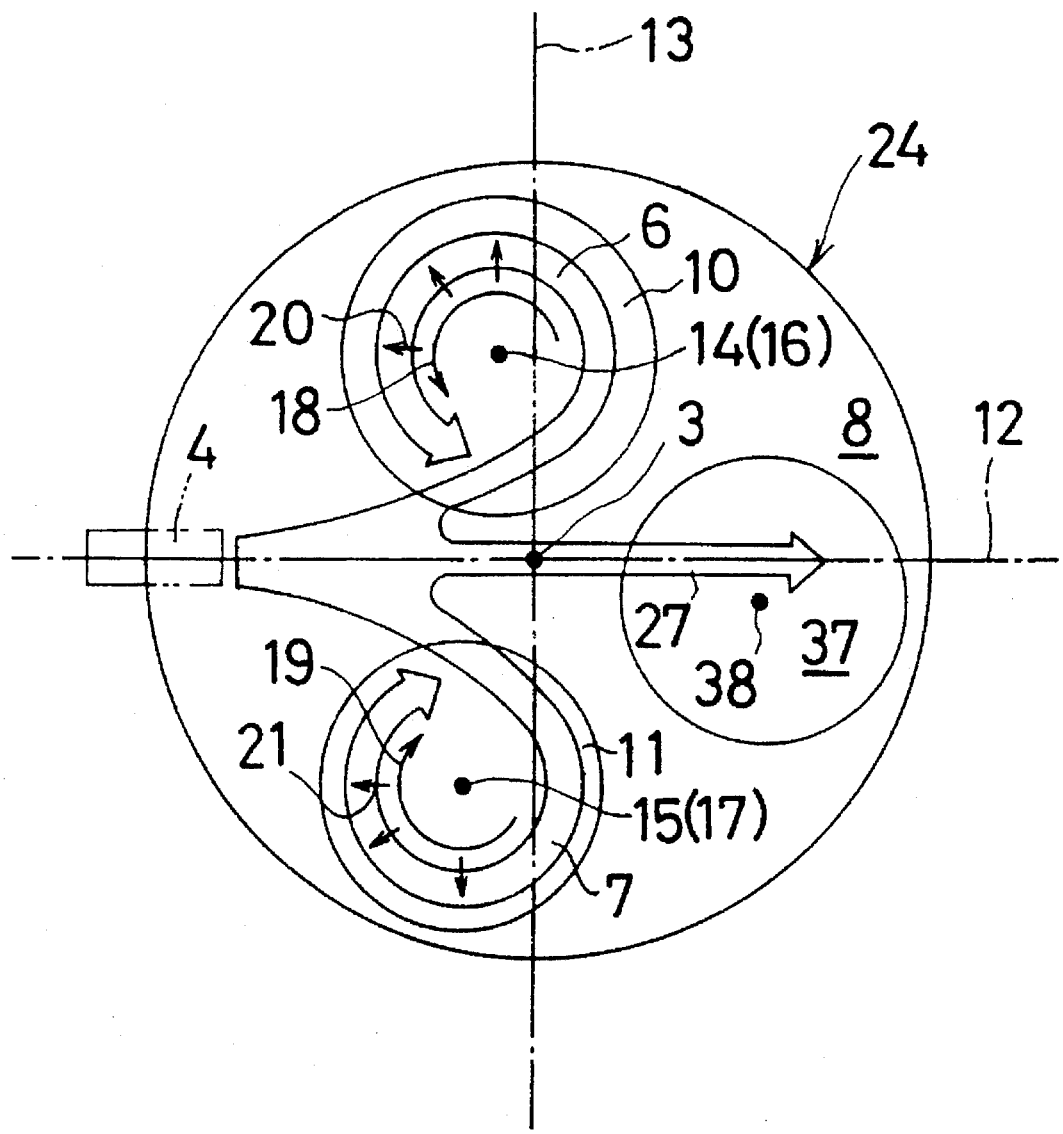
FIG. 12 is a plan view of a piston employed in a tenth embodiment of the present invention.

The tenth embodiment shown in FIG. 12 is a modified example of the first embodiment shown in FIG. 1, wherein the gas passing groove 40 is omitted. Even when the gas passing groove 40 is omitted like in this tenth embodiment, and also the eleventh and twelfth embodiments as will be explained below, the respective swirl centers 14, 15 of the pair of swirling gas flows 6, 7 are generated in substantially the same positions as in the case wherein the gas passing groove 40 is provided.

Figure 13:
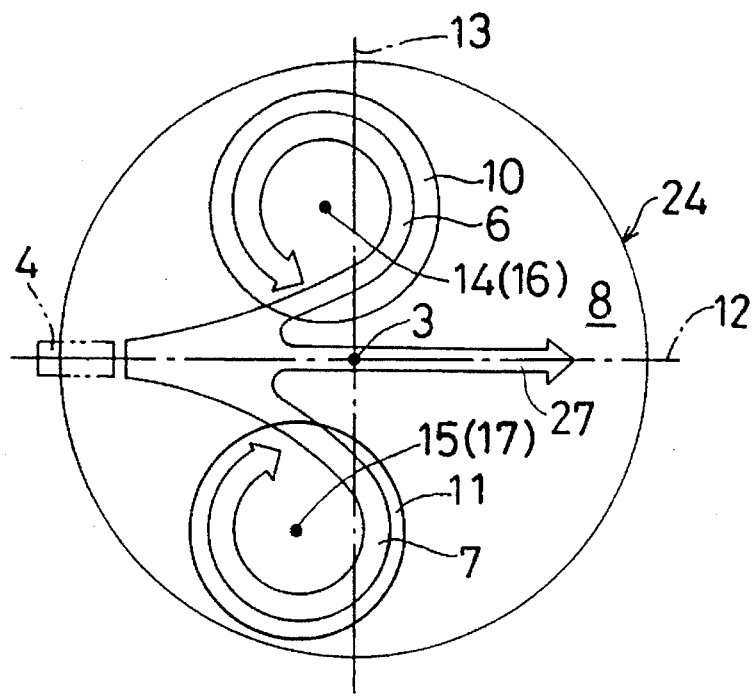
FIG. 13 is a plan view of a piston employed in an eleventh embodiment of the present invention.

The eleventh embodiment shown in FIG. 13 is a modified example of the tenth embodiment shown in FIG. 12, wherein only the pair of valve recesses 10, 11 are formed in the piston top surface 8 of the two-valve type engine.

Figure 14:
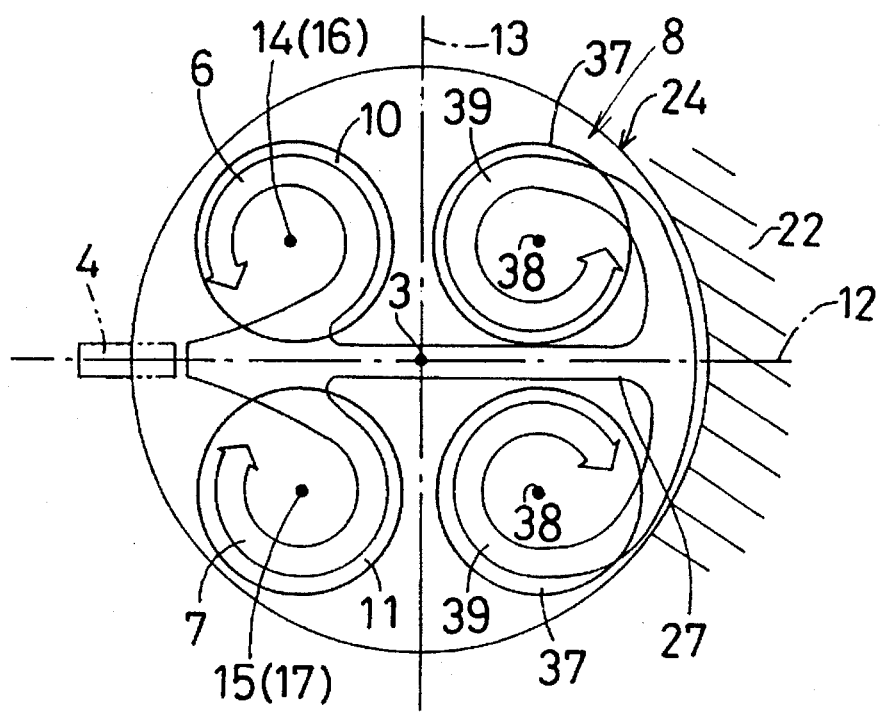
FIG. 14 is a plan view of a piston employed in a twelfth embodiment of the present invention.

The twelfth embodiment of FIG. 14 is a modified example of the tenth embodiment of FIG. 12, which has been applied to a four-valve type engine. That is, the foreside valve recess 37 is paired and the respective recess centers 38, 38 of the foreside valve recesses 37, 37 are disposed symmetrical to the respective recess center 16, 17 of the valve recesses 10, 11 with the phantom transverse line 13 therebetween. According to such a construction, the straight advancing gas flow 27 collides against the inner peripheral surface of the cylinder 22 and reverses to flow into valve recesses 37, 37 forming new swirling gas flows 39, 39 so that the mixing of the air within the respective valve recesses 37, 37 and the straight gas flow 27 is positively performed.

The present invention is not limited to the above-mentioned respective embodiments. For example, the type of the engine is not limited only to the vertical one but also it may be a horizontal one or an inclined one. The divided combustion chamber 1 is not limited only to the swirl chamber but also it may be a precombustion chamber. The pair of left and right valve recesses 10, 11 are formed not only in one of the cylinder head surface 9 and the piston top surface 8 facing the main combustion chamber 5 but in both of them.

A construction of the intake passage 28 of the first embodiment explained with reference to FIG. 3 may be employed also in other embodiments as far as it does not depart from its true nature.

Further, the respective recess centers 16, 17 of the pair of valve recesses 10, 11 may be disposed not only in a position offset from the phantom transverse line 13 toward the injection hole 4 but also on the phantom transverse line 13 or in a position offset from the phantom transverse line 13 toward the side opposed to the injection hole 4. In this case, it is necessary to keep the generation positions of the swirling gas flows 6, 7 apart from the injection hole 4 small so that the respective swirl centers 14, 15 of the paired swirling gas flows 6, 7 substantially coincide with the respective recess centers 16, 17 of the paired valve recesses 10, 11.

It is preferable to dispose the respective recess centers 16, 17 of the valve recesses 10, 11 eccentric relative to the phantom transverse line 13 toward the injection hole 4 like in the above-mentioned embodiments. Because, as the positions of the valve recesses 10, 11 and of the swirling gas flows 6, 7 get nearer to the injection hole 4, the swirling gas flows can be brought into contact with the air within the valve recesses 10, 11 at a higher flow speed and the mixing thereof can be carried out more effectively.

When viewed in parallel to the cylinder center axis 3, the positioning of the respective swirl centers 14, 15 of the paired swirling gas flows 6, 7 is not limited to on the respective recess centers 16, 17 of the paired valve recesses 10, 11 but it is enough to position the respective swirl centers 14, 15 at least within the pair of valve recesses 10, 11. Incidentally, since the effectiveness of the mixing of the air within the paired valve recesses 10, 11 and the paired swirling gas flows 6, 7 tends to be further improved as the respective swirl centers 14, 15 get nearer to the respective recess centers 16, 17, it is preferable to position the respective swirl centers 14, 15 within the respective regions surrounded by phantom circles having centers coinciding with the respective recess centers 16, 17 and having radii equal to two-thirds the radius of each valve recess 10, 11.

Further it is more preferable to position the respective swirl centers 14, 15 within respective regions surrounded by phantom circles having centers coinciding with the respective recess centers 16, 17 and having radii equal to one-second, one-fourth or one-fifth of the associated radius of each valve recess 10, 11. As far as the respective swirl centers 14, 15 are positioned within the valve recesses 10, 11 or within the regions surrounded by the above-mentioned phantom circles, the respective distances from the injection hole 4 to the respective recess centers 16, 17 are not always equal to each other.

The respective embodiments according to the present invention have such a feature that the respective swirl centers 14, 15 of the paired swirling gas flows 6, 7 generated with the combustion expanding gas injected from the injection hole 4 flows naturally along the piston top surface 8 are arranged within the pair of valve recesses 10, 11. That is, the respective embodiments are not constructed so as to forcibly deflect the combustion expanding gas flow toward the pair of valve recesses by means of the gas guide groove and the like. If the combustion expanding gas is deflected forcibly by means of the gas guide groove and the like, mostly it overflows from the gas guide groove before it reaches the pair of valve recesses and only a little combustion expanding gas is introduced into the pair of valve recesses.

Incidentally, the gas passing groove 40 explained in the above-mentioned embodiments is used merely for decreasing a restriction resistance between both the cylinder head surface 9 and the piston top surface 8 facing the main combustion chamber 5 but not for forcibly deflecting the combustion expanding gas toward the pair of valve recesses 10, 11. As previously explained, when considering that the positions of the respective swirl centers 14, 15 of the paired swirling gas flows 6, 7 can be located substantially at the same positions either with or without the gas passing groove 40, it can be understood that the combustion expanding gas is not deflected forcibly toward the pair of the valve recesses 10, 11 by the gas passing groove 40.

As many different embodiments of the invention will be obvious to those skilled in the art, some of which have been disclosed or referred to herein, it is to be understood that the specific embodiments of the invention as presented herein are intended to be by way of illustration only and are not limiting on the invention and it is to be understood that such embodiments, changes, or modifications may be made without departing from the spirit and scope of the invention as set forth in the claims appended hereto.

What is claimed is:

1. A divided chamber type diesel engine having a cylinder head (23) provided with a divided chamber (1), a cylinder (22) provided with a main combustion chamber (5), an injection hole (4) being formed in said cylinder head (23) at an eccentric position relative to a cylinder tenor axis (3), said injection hole (4) being oriented to a center potion of said cylinder (22) so that a combustion expanding gas injected from the injection hole (4) forms a straight advancing gas flow (27) along an injection axis (12) of the injection hole (4) and a pair of swirling gas flows (6), (7), on opposite sides of the injection axis (12) when viewed in parallel to said cylinder center axis (3), developed by a natural flow produced within the main combustion chamber (5) based on gas explosion;

at least a pair of valve recesses (10), (11) being formed concavely in at least one of a cylinder head surface (9) and a piston top surface (8) facing said main combustion chamber (5), said pair of valve recesses (10), (11) being arranged separately on the opposite sides of the injection axis (12) of said injection hole (4) when viewed in parallel to the cylinder center axis (3);

respective swirl centers (14), (15) of said pair of swirling gas flows (6), (7) being located within said pair of valve recesses (10), (11) when viewed in parallel to the cylinder center axis (3);

an intake passage (28) is formed in said cylinder head (23) while an intermediate intake valve opening (30) and an end intake valve opening (31) are formed in an intermediate portion and an end portion of said intake passage (28) respectively;

when a phantom transverse line (56) is defined imaginarily in a diametral direction of said cylinder (22) so as to intersect the cylinder center axis (3) perpendicularly when viewed in parallel to the cylinder center axis (3), said intake passage (28) is located in one region

(57) of two regions (54), (57) which are on the opposite sides of said phantom transverse line (56);

a suction air induction port portion, (58) of said intake passage (28) on its entrance side is formed substantially in parallel to said phantom transverse line (56);

by locating a center (60) of said end intake valve opening (31) nearer to said phantom transverse line (56) than a center (59) of said intermediate intake valve opening (30), a center passing line (61) passing through both said centers (59), (60) is inclined relative to an axis (62) of said suction air induction port portion (58); and by forming an inter-valve-opening port portion (63) located between both said centers (59), (60), substantially in parallel to said center passing line (61), an orientation of said inter-valve-opening port portion (63), is inclined relative to an orientation of said suction air induction port portion (58).

2. A diesel engine as set forth in claim 1, wherein there are provided three valves in total including intake valves (32), (33) and an exhaust valve (35).

3. A diesel engine as set forth in claim 1, wherein when viewing in parallel to the cylinder center axis 3, an external portion (65), remote from said second phantom transverse line 56, of the surrounding wall 64 of said inter-valve-opening port portion (63) is curved in an outwards swelling configuration.

4. A diesel engine as set forth in claim 1, wherein a diameter of said suction air induction port portion (58) is reduced in a region from its entrance portion to its end portion.

5. A diesel engine as set forth in claim 1, wherein when a phantom transverse line (13) perpendicular to the injection axis (12) of the injection hole (4) is defined imaginarily in the diametrical direction of the cylinder (22), the respective recess centers (16), (17) of the valve recesses (10), (11) are arranged offset from the phantom transverse line (13) to the side of the injection hole (4).

6. A divided chamber type diesel engine having a cylinder head (23) provided with a divided chamber (1), a cylinder (22) provided with a main combination chamber (5), an injection hole (4) being formed in said cylinder head (23) at an eccentric position relative to a cylinder center axis (3), said injection hole (4) being oriented to a center portion of said cylinder (22) so that a combustion expanding gas injected from the injection hole (4) forms a straight advancing gas flow (27) along an injection axis (12) of the injection hole (4) and a pair of swirling gas flows (6), (7), on the opposite sides of the injection axis (12) when viewed in parallel to said cylinder center axis (3), developed by a natural flow produced within the main combustion chamber (5) based on gas expansion;

at least a pair of valve recesses (10), (11) being formed concavely in at least one of a cylinder head surface (9) and a piston top surface (8) facing said main combustion chamber (5), said pair of valve recesses (10), (11) being arranged separately on the opposite sides of the injection axis (12) of said injection hole (4) when viewed in parallel to the cylinder center axis (3);

respective swirl centers (14) (15) of said pair of swirling gas flows (6), (7) being located within said pair of valve recesses (10), (11) when viewed in parallel to the cylinder center axis (3);

a gas passing groove (40) is formed concavely in said piston top surface (8) while an entrance portion (41) of said gas passing groove (40) is disposed at a position overlapping said injection hole (4) and said gas passing groove (40) is so formed as to extend from said entrance portion (41) to at least such portions (42), (43) of said pair of valve recesses (10), (11) which are situated nearer to the injection axis (12) respectively when viewed in parallel to the cylinder center axis (3), said gas passing groove (40) has all associated depth that gradually gets shallower as it departs farther from the injection hole (4) along the injection axis (12) of the injection hole (4) from said entrance portion (41).

7. A diesel engine as set forth in claim 6, wherein said gas passing groove (40) has an associated width that gradually increases as it departs farther from the injection hole (4) along the injection axis (12) of the injection hole (4).

8. A divided chamber type diesel engine having a cylinder head (23) provided with a divided chamber (1), a cylinder (22) provided with a main combustion chamber (5), an injection hole (4) being formed in said cylinder head (23) at an eccentric position relative to a cylinder Center axis (3), said injection hole (4) being oriented to a cylinder portion of said cylinder (22) so that a combustion expanding gas injected from the injection hole (4) forms a straight advancing gas flow (27) along an injection axis (12) of the injection hole (4) and a pair of swirling gas flows (6), (7), on the opposite sides of the injection axis (12) when viewed in parallel to said cylinder center axis (3), developed by a natural flow produced within the main combustion chamber (5) based on gas expansion;

at least a pair of valve recesses (10), (11) being formed concavely in at least one of a cylinder head surface (9) and a piston top surface (8) facing said main, combustion chamber (5), said pair of valve recesses (10), (11) being arranged separately on the opposite sides of the injection axis (12) of said injection hole (4) when viewed in parallel to the cylinder center axis (3);

respective swirl centers (14), (15) of said pair of swirling gas flows (6), (7) being located within said pair of valve recesses (10), (11) when viewed in parallel to the cylinder center axis (3);

a gas passing groove (40) is formed concavely in said piston top surface (8) while an entrance portion (41) of said gas passing groove (40) is disposed at a position overlapping said injection hole (4) and said gas passing groove (40) is so formed as to extend from said entrance portion (41) to at least such portions (42), (43) of said pair of valve recesses (10), (11) which are situated nearer to the injection axis (12) respectively when viewed in parallel to the cylinder center axis (3), said gas passing groove (40) has an associated width that gradually increases as it departs farther from the injection hole (4) along the injection axis (12) of the injection hole (4).

* * * * *